Patented May 26, 1953

2,639,553

UNITED STATES PATENT OFFICE 2,639,553

PROCESS OF TREATING AND HARVESTING OF FORAGE CROPS AND THE LIKE

Stanley D. Russell, Racine, Wis., assignor to J. I. Case Company, Racine, Wis., a company of Wisconsin No Drawing. Application October 14, 1946, Serial No. 703,093

2 Claims. (Cl. 47—58)

This invention relates to a process of treating and harvesting forage crops and the like.

The invention is particularly suitable for application to the harvesting of perennial hay crops such as alfalfa, clover and the like.

One of the principal objects of the invention is to reduce the waste and loss of leaves and other parts of the crop, entailed in prior harvesting methods wherein the crop is cut, allowed to cure on the ground, raked and then picked up.

Another object of the invention is to save labor and cost in harvesting, by eliminating the successive steps required in such prior harvesting methods, and accomplishing the complete harvesting of the crop in a single passage over the field.

Another object is to improve the quality of the harvested crop by more uniformly curing the same and preventing it from becoming contaminated with dirt and trash from the ground.

Another object is to conserve the moisture in the roots of perennial forage crops for starting of a successive growth.

Another object is to provide for more rapid and complete curing of the crop without requiring additional operations such as tedding and turning of cut windrows.

In carrying out the invention the growing crop is killed and cured prior to the time of harvesting the same, as by the application to the standing crop of heat in any form such as dry steam or hot gases, or by the application of electricity in any form such as the use of high potential shocks or electro-static means, or by suffocation from the application of gases thereto.

One of the preferred methods is that of applying hot combustion gases to the standing crop just prior to and in conjunction with the harvesting of the crop.

The gases should contain a large amount of $CO_2$, as in the exhaust gases from a tractor engine or from oil burners specially provided for the purposes, and should be applied by suitable fan means for subjecting the standing plants to an effective blast of the hot gases for substantially the full height of the plants above the ground, and in a progressive swath of treatment.

The proper temperature for the gas, and the proper speed for the vehicle, can be determined by routine experimentation on a portion of a row, so that the heat will not be great enough to fell or consume the crop plants, but at the same time the heat will be sufficient to have the killing effect.

A most efficient method is to kill the crop by any means, allow the crop sufficient time to cure and then follow with the harvesting means which delivers the cut crop directly onto a conveyance, a baler, or other suitable harvesting means. In this process of harvesting, the hay or other forage crop does not touch the ground and therefore does not become contaminated with dirt, trash and stones, resulting in a cleaner, more palatable hay.

Where the killing treatment is carried out separately and the hay allowed to stand a short while prior to harvesting, the treating equipment should be on a light weight thin wheeled self-propelled running gear to avoid trampling of the hay. Allowing the hay to stand a short while after killing effects more adequate curing of the hay and the moisture therein has a tendency to revert to the roots so that there is a conservation of the plant moisture content for use in a successive growth of the plant, whereas by conventional harvesting the green uncured plant is cut off at the ground and all moisture within the cut off portion is lost by evaporation.

In the event of a rain prior to harvesting and after killing of the crop, the standing plants will readily dry out and be ready for harvesting much sooner and without the former need for tedding or turning, as by raking for the sole purpose of drying the crop.

The invention avoids the necessity for raking and saves a great deal of time and expense in the harvesting of hay.

With the process of the invention the growth of the hay is stopped at the right time to make the best type of food for animals, regardless of weather conditions. The treatment may be carried out when the hay is wet as well as when it is reasonably dry. Greener crops can be cured readily by the use of the invention and it is not necessary to wait until a selected ripeness has been reached before cutting.

The treatment should be such as to stop the plant growth and to close the pores of the leaves against breathing. It may be said that the treatment effects a pre-curing of the standing crop and makes it ready for immediate storage upon cutting.

Various practices of the invention may be employed within the scope of the accompanying claims.

I claim:

1. The process of killing and harvesting a standing economic crop for forage, which comprises killing the plant growth of the crop by progressively subjecting the standing crop while the crop is green and in bloom to a flow of hot gas applied to substantially the full height of the crop plants above the ground and at a temperature and speed of application sufficient to kill the plant growth but insufficient to fell or consume the crop, thereafter allowing the crop to stand and dry by exposure to the free uncontaminated atmosphere, and then cutting the crop plants just above the ground and gathering the crop simultaneously with said cutting.

2. The process of killing and harvesting a standing economic crop for forage, which comprises permanently stunting the standing plant growth of the crop by progressively subjecting the standing crop for substantially the full height of the crop plants above the ground and while the crop is green and in bloom to a plant growth stunting medium in an amount and at a speed of application of said medium sufficient to kill the plant growth but insufficient to fell or consume the crop, thereafter allowing the crop to stand and dry by exposure to the free uncontaminated atmosphere, and then cutting the crop plants just above the ground and gathering the crop simultaneously with said cutting.

STANLEY D. RUSSELL.

References Cited in the file of this patent

UNITED STATES PATENTS

| Number | Name | Date |
|---|---|---|
| 492,635 | Sharp | Feb. 28, 1893 |
| 915,693 | Pacha | Mar. 16, 1909 |
| 1,399,229 | Servoss | Dec. 6, 1921 |
| 1,547,765 | Lang | July 28, 1925 |
| 1,709,270 | Lang | Apr. 16, 1929 |
| 1,952,588 | Golden | Mar. 27, 1934 |
| 1,987,368 | McGary | Jan. 8, 1935 |
| 2,176,175 | George | Oct. 17, 1939 |
| 2,288,569 | Mason | June 30, 1942 |
| 2,327,204 | McLemore | Aug. 17, 1943 |
| 2,465,070 | Demuth | Mar. 22, 1949 |

FOREIGN PATENTS

| Number | Country | Date |
|---|---|---|
| 2,019 | Great Britain | of 1856 |
| 321,452 | Great Britain | Nov. 11, 1929 |

OTHER REFERENCES

Chemical Abstracts, vol. 31 (1937), columns 7939 and 7940.

Chemical Abstracts, vol. 34 (1940), columns 5884 through 5889.

Pacific Rural Press, vol. 144, No. 13, p. 356, Dec. 26, 1942.

Pacific Rural Press, vol. 145, No. 1, p. 23, Jan. 9, 1943.

Journal of Ministry of Agriculture, vol. 51, No. 6, pp. 277, 278, 279, pub. Sept. 1944, in Great Britain.

Spencer, "Cane Sugar Handbook," 8th ed., p. 16, pub. before June 8, 1945.